(12) United States Patent
Caretta et al.

(10) Patent No.: US 7,128,115 B2
(45) Date of Patent: Oct. 31, 2006

(54) METHOD AND AN APPARATUS FOR MANUFACTURING COMPONENTS OF A TIRE FOR VEHICLE WHEELS

(75) Inventors: Renato Caretta, Gallarate (IT); Osvaldo Scarzello, Turin (IT); Maurizio Marchini, Seregno (IT)

(73) Assignee: Pirelli Pneumatici S.p.A., Milan (IT)

( * ) Notice: Subject to any disclaimer, the term of this patent is extended or adjusted under 35 U.S.C. 154(b) by 357 days.

(21) Appl. No.: 10/453,685

(22) Filed: Jun. 4, 2003

(65) Prior Publication Data

US 2003/0209329 A1 Nov. 13, 2003

Related U.S. Application Data

(60) Division of application No. 09/881,021, filed on Jun. 15, 2001, now Pat. No. 6,635,132, which is a continuation of application No. PCT/IT99/00377, filed on Nov. 19, 1999.

(60) Provisional application No. 60/118,529, filed on Feb. 2, 1999.

(30) Foreign Application Priority Data

Dec. 17, 1998 (EP) ................................ 98830762

(51) Int. Cl.
*B29D 30/10* (2006.01)
(52) U.S. Cl. ...................................... 156/396; 156/397
(58) Field of Classification Search ................ 156/111, 156/117, 130, 133, 396, 397
See application file for complete search history.

(56) References Cited

U.S. PATENT DOCUMENTS 3,607,497 A * 9/1971 Chrobak ...................... 156/95

4,474,399 A 10/1984 Lauber (Continued)

FOREIGN PATENT DOCUMENTS

EP 0 780 221 6/1997

(Continued)

OTHER PUBLICATIONS

U.S. Appl. No. 09/881,021, filed Jun. 15, 2001, Caretta et al.

*Primary Examiner*—Geoffrey L. Knable
(74) *Attorney, Agent, or Firm*—Finnegan, Henderson, Farabow, Garrett & Dunner, L.L.P.

(57) ABSTRACT

An apparatus for manufacturing components for a tire being worked is provided. The apparatus includes a toroidal support for carrying the components of a tire being worked. The toroidal support has an outer surface substantially matching an inner shape of the tire. The apparatus also includes means for feeding at least one elongated element through at least one delivery member disposed adjacent to the outer surface of the toroidal support. The apparatus also includes means for circumferential distribution arranged to drive the toroidal support in rotation around a geometric axis of rotation of the toroidal support so that the at least one elongated element is circumferentially distributed on the toroidal support. The apparatus also includes means for transverse distribution arranged to give controlled relative displacements between the toroidal support and the delivery member for distributing the at least one elongated element to form a plurality of coils disposed in side-by-side relationship in order to define a tire component. The transverse distribution means operates on the toroidal support for moving the toroidal support relative to the delivery member, and the circumferential distribution means and the transverse distribution means are integrated into a robotized arm.

13 Claims, 4 Drawing Sheets

U.S. PATENT DOCUMENTS

| | | |
|---|---|---|
| 4,963,207 A | 10/1990 | Laurent |
| 5,171,394 A | 12/1992 | Laurent |
| 5,221,406 A | 6/1993 | Laurent |
| 5,453,140 A | 9/1995 | Laurent et al. |
| 5,853,526 A * | 12/1998 | Laurent et al. ............. 156/396 |

FOREIGN PATENT DOCUMENTS

| | | |
|---|---|---|
| GB | 1 048 241 | 11/1966 |
| GB | 2 147 561 A | 5/1985 |
| WO | WO 91/04843 | 4/1991 |

* cited by examiner

METHOD AND AN APPARATUS FOR MANUFACTURING COMPONENTS OF A TIRE FOR VEHICLE WHEELS

CROSS-REFERENCES TO RELATED APPLICATIONS

This application is a divisional of U.S. patent application Ser. No. 09/881,021, filed Jun. 15, 2001, now U.S. Pat. No. 6,635,132 which is a continuation of International Patent Application Ser. No. PCT/IT99/00377, filed Nov. 19, 1999, in the European Patent Office; additionally, Applicants claim the right of priority under 35 U.S.C. § 119(a)–(d) based on European Patent Application Serial No. 98830762.5, filed Dec. 17, 1998, in the European Patent Office; further, Applicants claim the benefit under 35 U.S.C. § 119(e) based on U.S. Provisional Patent Application Ser. No. 60/118,529, filed Feb. 2, 1999; the contents of all of which are relied upon and incorporated herein by reference.

BACKGROUND OF THE INVENTION

1. Field of the Invention

The present invention relates to a method of manufacturing components for a tyre for vehicle wheels, of the type comprising the steps of: a) feeding an elongated element from a delivery member disposed adjacent to an outer surface of a toroidal support; b) giving the toroidal support a rotatory motion for circumferential distribution around a geometric axis of rotation thereof, so that the elongated element is circumferentially distributed onto the toroidal support; c) carrying out controlled relative displacements between the toroidal support and the extrusion die so as to form with said elongated element, a plurality of coils disposed mutually in side by side relationship in order to define a tyre component.

The invention also relates to an apparatus for manufacturing components for a tyre being worked, of the type comprising: a toroidal support arranged for carrying the components of a tyre being worked; feeding devices or other convenient feeder means for feeding at least one elongated element through a delivery member disposed adjacent to an outer surface of the toroidal support; circumferential-distribution devices or other convenient circumferential-distribution means arranged to drive the toroidal support in rotation around a geometric axis thereof, so that said elongated element is circumferentially distributed onto the toroidal support itself; transverse-distribution devices or other convenient transverse-distribution means arranged to give a relative movement between the toroidal support and said delivery member, for distributing said elongated element so as to form a plurality of coils disposed in side by side relationship in order to define a tyre component.

2. Description of the Related Art

Manufacturing of tyres for vehicle wheels involves formation of a carcass structure essentially consisting of one or more carcass plies having a substantially toroidal configuration and the axially opposite side edges of which are connected to respective circumferentially-inextensible annular reinforcing elements, usually named "bead cores".

Applied to the carcass structure, at a radially outer position thereof, is a belt structure comprising one or more belt strips in the form of a closed ring, essentially made up of textile or metallic cords suitably oriented in respect of each other and of the cords belonging to the adjacent carcass plies.

At a radially outer position relative to the belt structure, a tread band is then applied which usually consists of a strip of elastomer material of suitable thickness.

It is to point out that, to the purposes of the present description, by the term "elastomer material" it is intended the rubber blend in its entirety, that is the bled formed of at least one base polymer suitably amalgamated with reinforcing fillers and process additives of various types.

Ultimately, on the opposite sides of the tyre being manufactured, a pair of sidewalls is applied, each of which covers one side portion of the tyre included between a so-called shoulder region, located close to the corresponding side edge of the tread band, and a so-called bead located at the corresponding bead core.

Traditional production methods essentially provide that the above listed tyre components should be first made separately of each other, to be then assembled in a tyre-manufacturing step.

The Applicant's present trend is however that of resorting to production methodologies enabling production and stocking of semi-finished products to be minimized or, possibly, eliminated.

Practically, the Applicant's research and development are oriented towards new process solutions enable to manufacture the individual components applying them directly to the tyre being manufactured according to a preestablished sequence.

On the other hand, from U.S. Pat. No. 5,453,140 it is known a method and an apparatus forming a carcass ply by laying down a plurality of parallel cords disposed circumferentially in side by side relationship onto a rigid toroidal support the shape of which matches that of the tyre to be obtained, which cords are drawn from a continuous cord sequentially cut into lengths of appropriate size.

The Applicant too has developed manufacturing methods for forming a carcass structure, in which the carcass plies are obtained by laying down onto a rigid toroidal support, strip-like lengths obtained by sequentially cutting a continuous element made up of several cords incorporated into a layer of elastomer material.

Within the manufacturing scope of the carcass structure, as well as of other structural tyre components such as sidewalls and tread band for example, manufacturing processes have been also proposed which aim at obtaining the desired component by laying down onto the tyre being worked, a continuous strip-like element of elastomer material of a reduced section relative to that of the component to be obtained, and such arranged as to form a plurality of coils disposed consecutively in side by side and/or overlapped relationship around the rotation axis of the tyre, so as to define the component itself in its final configuration.

In more detail, in U.S. Pat. Nos. 4,963,207 and 5,171,394 a method and an apparatus are respectively described in which given tyre components are obtained by laying down a strip-like element of elastomer material onto a rigid toroidal support, which strip-like element is continuously fed from a delivery member associated with a volumetric extruder.

While the toroidal support is rotated around its own geometric axis, giving rise to a circumferential distribution of the strip-like element, the volumetric extruder is moved so as to impart controlled displacements to the delivery member in a meridian plane of the toroidal support, in order to distribute the different coils formed by the continuous strip-like element according to a predetermined pattern.

In U.S. Pat. No. 5,221,406 it is provided that a plurality of volumetric extruders should be arranged around the toroidal support, each of them being adapted to feed, through its own delivery member, a respective continuous strip-like element to be selectively employed for making a given tyre component.

SUMMARY OF THE INVENTION

In accordance with the present invention, it has been found that if the controlled relative displacements between the toroidal support and delivery member are carried out by directly moving the toroidal support, instead of the extruder or any other apparatus associated with the delivery member itself, important advantages can be achieved in terms of simplification of the production plants, operation flexibility and productivity, as a result of a reduction in working dead times.

In more detail, it is an object of the present invention a method of manufacturing components for a tyre for vehicle wheels, characterized in that said transverse-distribution displacements are performed by moving the toroidal support.

In more detail, both driving in rotation and movements of the toroidal support are preferably carried out by a robotized arm carrying the toroidal support itself.

Advantageously, the transverse-distribution displacements are carried out by moving the toroidal support according to at least five axes of oscillation, and more preferably according to at least six axes of oscillation.

It may be also advantageously provided that during the circumferential distribution of said at least one elongated element, the toroidal support should be moved keeping such an orientation that its geometric axis will be greatly inclined, preferably at an angle greater than 45°, relative to a horizontal plane.

It may be also provided that feeding of the elongated element should be carried out by extrusion through said delivery member, said elongated element being at least partly made of a raw elastomer material.

The toroidal support can be advantageously brought in front of said delivery member by said robotized arm, after removal of the toroidal support itself from a work station intended for executing a previous working step on the tyre itself.

In accordance with the method in reference, the step of moving the toroidal support away from said delivery member by said robotized arm may be also provided, in order to transfer it either in front of at least another delivery member for formation of a further tyre component or to a work station for carrying out a subsequent work step on the tyre.

Said work station may be advantageously intended for formation of at least one carcass ply by sequential deposition of strip-like elements onto the toroidal support, the latter being supported and driven by the robotized arm, in a step-by-step movement around said geometric axis in synchronism with deposition of the individual strip-like elements, so as to give rise to a distribution of the strip-like elements according to a predetermined circumferential pitch.

It is also an object of the invention an apparatus for manufacturing components for a tyre being worked, characterized in that said transverse-distribution devices or other convenient transverse-distribution means operate on said toroidal support for moving it with respect to the delivery member.

Advantageously, said circumferential-distribution means and said transverse-distribution means are integrated into a robotized arm.

More in particular, in a preferential embodiment the robotized arm comprises: a first section having a first end rotatably connected to a support platform according to first and second oscillation axes perpendicular to each other; a second section connected to a second end of the first section in an oscillating manner according to a third and a fourth oscillation axes perpendicular to each other; an end head arranged to engage rotatably and preferably in overhanging the toroidal support around the geometric rotation axis of the former, and connected to the second section in an oscillating manner at least according to a fifth axis of oscillation perpendicular to said fourth oscillation axis.

In more detail, said end head is in addition susceptible of oscillation around at least one sixth axis perpendicularly oriented with respect to the fifth oscillation axis.

At least one further work station is in addition preferably provided which is spaced apart from said feeder means and arranged to carry out a different work step on the tyre, said robotized arm being arranged to transfer the toroidal support between said feeder means and work station.

Said further work station can be conveniently intended for making at least one carcass ply by sequential deposition of strip-like elements onto the toroidal support, said robotized arm being arranged to make the toroidal support rotate in a step-by-step movement around said geometric rotation axis, to cause a distribution of the strip-like elements according to a predetermined circumferential pitch.

BRIEF DESCRIPTION OF THE DRAWINGS

Further features and advantages will become more apparent from the detailed description of a preferred nonexclusive embodiment of a method and an apparatus for manufacturing components for tyres for vehicle wheels in accordance with the present invention. This description will be taken hereinafter with reference to the accompanying drawings given by way of non-limiting example, in which.

DETAILED DESCRIPTION OF THE PREFERRED EMBODIMENTS

Figure 1:
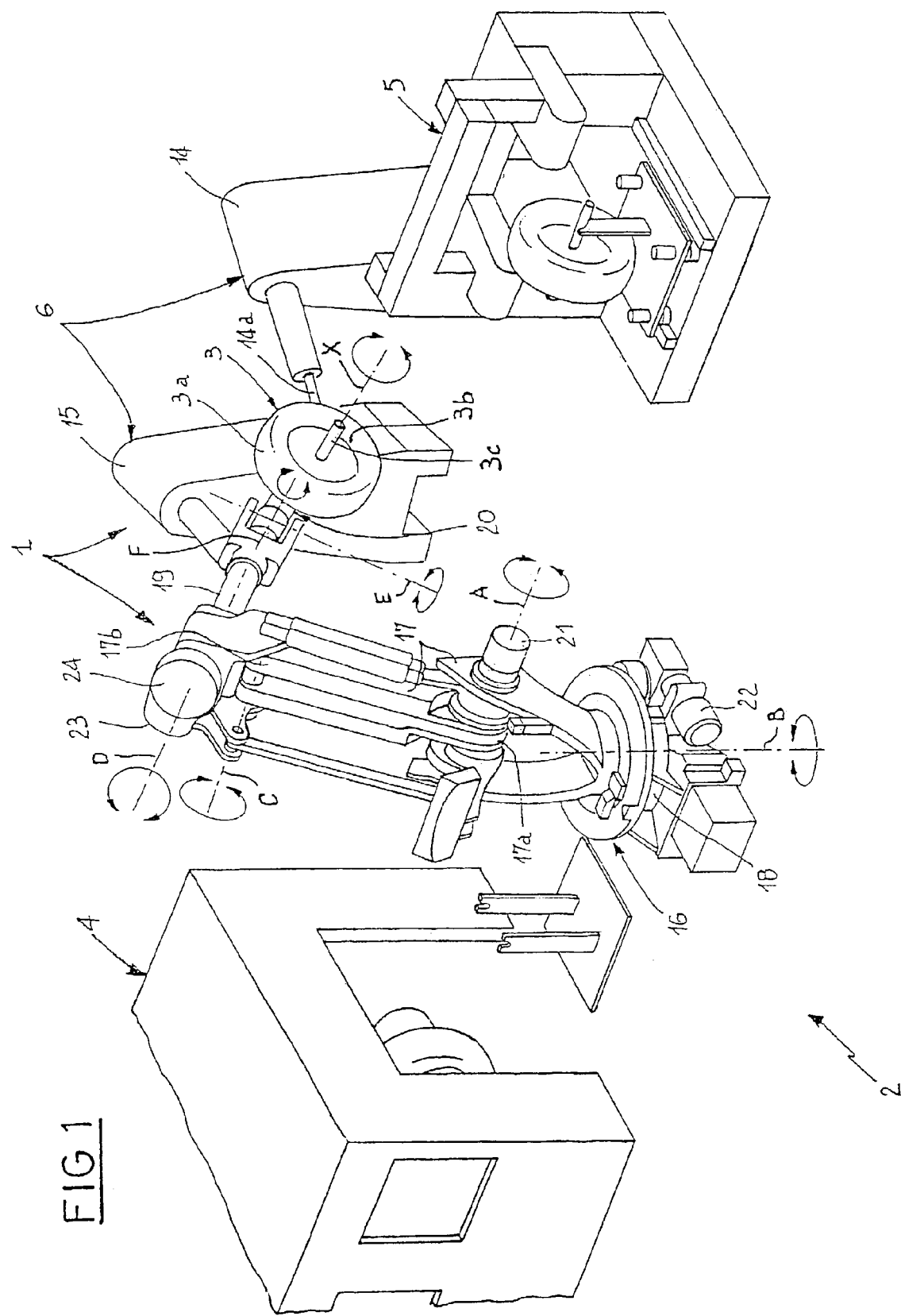
FIG. 1 is a diagrammatic perspective view of an apparatus in accordance with the invention, incorporated into a plant for manufacturing tyres, only partly shown.

With reference to FIG. 1, an apparatus for manufacturing components for tyres for vehicle wheels in accordance with the present invention has been generally identified by reference numeral 1.

Apparatus 1 is associated with a plant 2 intended for producing tyres for vehicle wheels or executing part of the workings provided in the tyre production cycle. Within the scope of these workings, manufacture of different tyre components is conveniently provided, which components are to be obtained directly on a rigid toroidal support 3 having an outer surface 3a, 3b the shape of which substantially matches the inner shape of the tyre itself.

For the purpose, plant 2 generally comprises a plurality of work stations 4, 5, 6 each intended for carrying out at least one of said workings aiming at manufacturing the tyre on the toroidal support 3.

Figure 2:
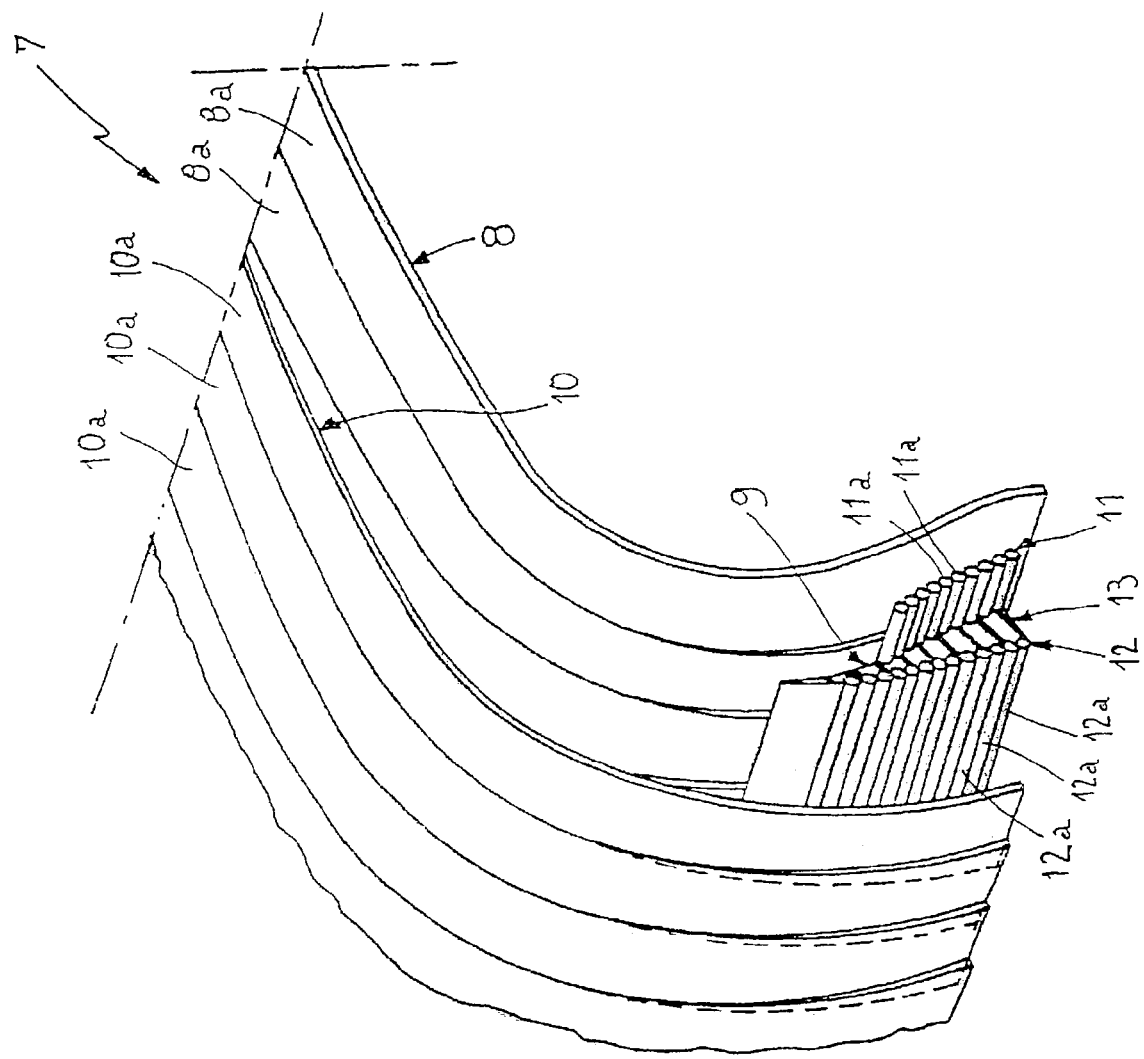
FIG. 2 is a perspective split view showing, by way of example only, a carcass structure of a tyre obtainable by the method and apparatus in reference.

In more detail, in the example shown in FIG. 1 and described by way of example only, a portion of plant 2 is shown which is arranged to form a carcass structure generally identified by 7 in FIG. 2, on the outer surface 3a, 3b of the toroidal support 3. Carcass structure 7 essentially comprises at least one first carcass ply 8 such arranged as to cover the outer surface 3a, 3b of the toroidal support 3, at least one pair of annular reinforcing structures 9 disposed at respective end edges of the carcass ply 8 and an optional second carcass ply 10 placed in superposed relationship with the first carcass ply 8 and the annular reinforcing structures 9. Each annular reinforcing structure essentially comprises first and second circumferentially-inextensible annular inserts 11, 12 each comprising at least one metal wire wound in several coils 11a, 12a disposed in the form of a crown, and a filling body of elastomer material 13 axially interposed between the first and second annular inserts 11, 12.

The foregoing being stated, in the plant portion 2 intended for making the carcass structure 7 may be for example provided a first work station 4 for executing a step of pre-heating the toroidal support 3, and/or for the optional application of a so-called "liner" to the outer surface thereof, i.e. a thin rubber layer that, when vulcanization has been completed, will be airtight in order to ensure maintenance of the operating pressure in the tyre.

A second work station 5 can be in turn intended for forming carcass plies 8, 10. Formation of each ply 8, 10 can be advantageously carried out by sequential deposition of strip-like elements 8a, 10a, disposed consecutively in side by side relationship in a mutually circumferential approach onto the outer surface 3a, 3b of the toroidal support 3. Further details as regards the manufacturing modalities of the carcass ply or plies 8, 10 in the second work station 5 are widely disclosed in European Patent Applications No. 97830731.2 and No. 97830733.8 in the name of the same Applicant.

Also provided is at least one third work station 6 arranged to form the annular reinforcing structures 9 at the inner end edges of the first carcass ply 8.

For the purpose, the third work station 6 comprises feeding devices or other convenient feeder means arranged to supply one or more elongated elements to be employed in making the filling body 13 and the inextensible annular inserts 11, 12.

In more detail the feeder means may for example comprise a first extruder 14 arranged to supply, through a respective delivery member 14a, at least one first continuous elongated element consisting of a strip of elastomer material of suitable size in cross section, to be employed for making the filling body 13 of each of the annular reinforcing structures 9.

More specifically, it is preferably provided for the cross section of the elastomer strip emerging from the delivery member 14a of the first extruder 14 to have a conveniently reduced section as compared with the transversal cross-section of the filling body 13 to be made.

The filling body 13 in its final configuration is obtained by delivery of the continuous elastomer strip onto the toroidal support 3 while said support, upon the action of circumferential-distribution devices or other convenient circumferential-distribution means, is driven in a rotatory circumferential-distribution motion around a geometric axis of rotation thereof denoted by "X".

Concurrently with the rotation imposed to the toroidal support 3, transverse-distribution devices or other convenient transverse-distribution means to be better described in the following will give rise to controlled relative displacements between the toroidal support itself and the delivery member 14a associated with the first extruder 14, in such a manner that the elastomer strip will form a series of coils disposed radially and/or axially in side by side relationship until they define the filling body 13.

The feeder means provided in the third work station 6 may further comprise at least one second extruder 15 arranged to supply, through a respective delivery member not shown in the drawings, a second continuous elongated element consisting, for example, of a rubberized metal wire for example, to be employed for making the annular inserts 11, 12 being part of each annular reinforcing structure 9. It is to note that the second extruder 15 can be replaced by a different feed unit, if for example a bare metal wire or a non-rubberized textile cord should be wished to be fed for the purpose of making each filling insert 11, 12.

Each inextensible annular insert 11, 12 is made by circumferentially laying down the respective rubberized metal wire onto the toroidal support 3, by virtue of the rotatory circumferential-distribution motion imparted to said support around a geometric axis thereof denoted by "X". Meanwhile, a transverse-distribution movement is also carried out between the toroidal support 3 and the delivery member of the second extruder 15, in such a manner that the continuous elongated element will form a series of coils 11a, 12a disposed consecutively in side by side relationship on moving away from or bring near to the rotation axis "X" of the toroidal support 3, so as to form the respective annular insert 11, 12.

In accordance with the present invention, both the circumferential-distribution movement, i.e. rotation of the toroidal support around its axis "X", and the transverse-distribution movement are accomplished by directly moving the toroidal support 3.

Under this circumstance, the extruders 14, 15 forming the means for feeding the elongated element can advantageously keep a fixed positioning during formation of the different components on the tyre being worked.

For the purpose it is provided that the circumferential-distribution means intended for driving the toroidal support in rotation around its axis "X" and the transverse-movement means should be integrated into a robotized arm generally identified by 16, arranged to engage removably and preferably in overhanging the toroidal support 3 so as to sequentially bring it in front of each of the work stations 4, 5, 6 and conveniently move it relative to said stations.

In particular the robotized arm 16, preferably of the anthropomorphic type with seven axes, comprises a first section 17 having a first end 17a connected to a support platform 18 for rotation around a first horizontally-disposed oscillation axis "A", and around a second axis "B" disposed vertically or at all events perpendicular to the first oscillation axis "A".

The robotized arm 16 further comprises a second section 19 linked to a second end 17b of the first section 17, with possibility of oscillation about a third axis "C", preferably parallel to the first axis "A" and also around a fourth oscillation axis "C" perpendicular to the third axis "C" and preferably disposed longitudinally of the second section itself.

An end head 20 is operatively associated, at its end, with the seconds section 19 and is such arranged as to removably engage the toroidal support 3. Associated with the end head 20 is said circumferential-distribution means, consisting of a moter 25 for example, driving in rotation a grip element 26 intended to removably engage and preferably in overhanging the toroidal support 3 at an attached shank 3c coaxially projecting from the opposite sides of said support.

In addition, the end head 20 is susceptible of oscillation around a fifth axis "E", perpendicular to the fourth oscillation axis "D".

In a preferential solution, the fifth axis "E" is coplanar with the fourth axis "D", and the end head 20 is in addition susceptible of oscillation under the action of a respective motor 27 (FIG. 3), around a sixth axis "F" perpendicularly oriented relative to the toroidal support 3, and relative to the fifth axis of oscillation Movements of the first section 17, the second section 18 and the end head 20 around the respective oscillation axes "A", "B", "C", "D", "E", "F" are managed by respective motors, of which only the motors intended for movement around the first, second, third fourth and sixth axes are shown and identified by 21, 22, 23, 24, 27 respectively.

The motor not shown intended for movement around the fifth axis "E", like on the other hand the other motors too, can be however carried out in any manner convenient for a person skilled in the art.

Operation of all motors associated with the transverse-distribution means, as well as of the motor 25 associated with the circumferential-distribution means, is managed by an electronic control unit (not shown) in a manner adapted to ensure correct movement of the toroidal support 3 in the respective work stations 4, 5, 6, for the purpose of obtaining a correct formation of the tyre components.

Employment of the transverse-distribution means directly operating on the toroidal support 3 offers the advantage of being able to use the same robotized arm 16 both for managing movement of the toroidal support 3 in front of the individual extruders 14, 15 and/or other feeder means provided in the first, second, third and other possible work stations, and for causing transfer of the toroidal support from a work station to another one.

In particular, in the example shown the robotized arm 16 picks up the toroidal support 3 from the first work station 4 in order to transfer it to the second work station 5 for the purpose of forming the first carcass ply 8.

During formation of the first carcass ply 8, the toroidal support 3 preferably stays in engagement with the robotized arm 16 that advantageously carries out suitable orientation of support relative to the devices for delivering and laying down the strip-like elements 8a provided in the second station itself, and drives it in rotation according to a step-by-step movement around the geometric axis "X", in synchronism with operation of the above mentioned delivery and deposition devices or other convenient delivery and deposition means, so as to cause distribution of the strip-like elements according to a predetermined circumferential pitch.

Subsequently, the toroidal support 3 is picked up from the second work station 5 to be brought in front of the first extruder 14 of the third work station 6, for the purpose of forming the first inextensible annular insert 11 of each annular reinforcing structure 9.

The toroidal support 3 is then brought in front of the second extruder 14 of the third work station 6, in order to give rise to formation of the filling body 13 of each annular reinforcing structure 9, to be then shifted again in front of the first extruder 14 for the purpose of enabling accomplishment of the second annular insert 12 and thus completing formation of the annular reinforcing structures 9.

Mobility of the toroidal support in the six oscillation axes "A", "B", "C", "D", "E", "F", in addition to driving in rotation of same around the geometric axis "X", enables a correct deposition of the elongated elements coming from extruders 14, 15 to be carried out, irrespective of the conformation of the toroidal support 3 and the tyre components to be obtained.

When formation of the annular reinforcing structures 9 has been completed, the toroidal support 3 can be transferred again to the second work station 5 to enable formation of the second carcass ply 10 in the same manner as previously described in connection with the first carcass ply 8, thus completing manufacture of the tyre carcass structure 7.

The same robotized arm 16, or one or more similar robotized arms installed in respective adjacent work areas provided in plant 2, can be designed for movement of the toroidal support 3 in front of further extruders or other feeding devices arranged to deliver the elongated elements provided for accomplishment of further tyre components, such as sidewalls, tread band, belt layers for example, or the like, as well as for carrying out transfer of the toroidal support to other work stations designed for tyre vulcanization, for example.

Therefore a complete working cycle of the tyre can be made advantageously possible by forming all components thereof on the same toroidal support 3 which is sequentially transferred between the different work stations by one or more robotized arms 16, which arms also carry out handling of the toroidal support for the purpose of forming the individual components of the tyre itself.

The present invention achieves important advantages.

Direct movement of the toroidal support represents an important improvement over the known art on the contrary providing movement of the extruders, above all in terms of simplification of the plants and reduction in the working dead times during the transferring steps from one station to another.

It is in fact to note that the toroidal support has an overall mass greatly lower than that of the extruders, movement of which is on the other hand made still more difficult due to the necessity to also move at least part of the apparatuses intended for feeding semifinished products to the extruders themselves.

In conclusion, movement of the toroidal support for achieving a correct transverse distribution of the elongated elements can be advantageously carried out in a quicker manner and with use of more limited spaces than those required in the known art.

Figure 3:
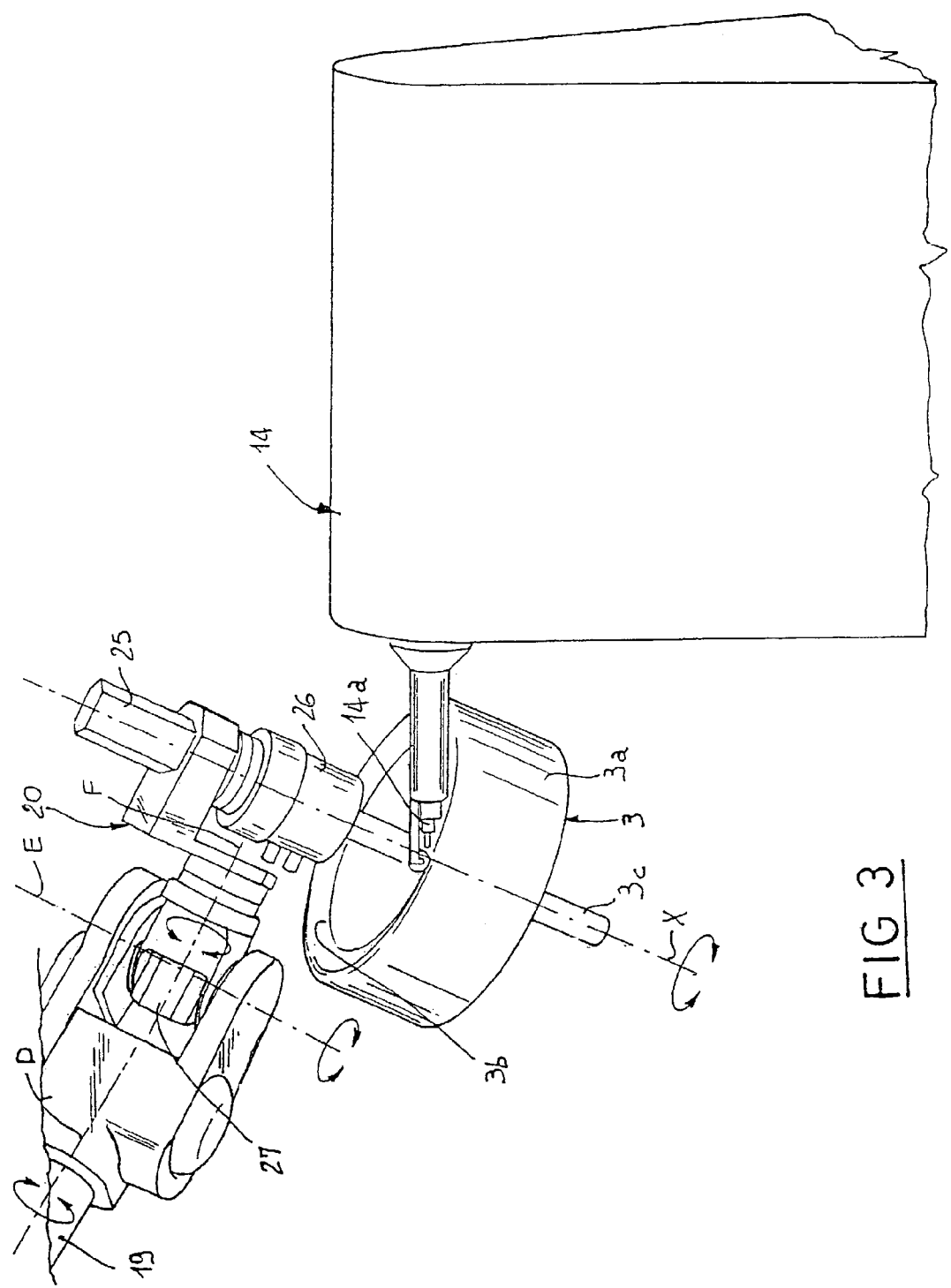
FIG. 3 shows, in enlarged scale relative to FIG. 1, the end head of the robotized arm during the application of an elongated element in an area proximate to one of the beads of the tyre to be manufactured.
Figure 4:
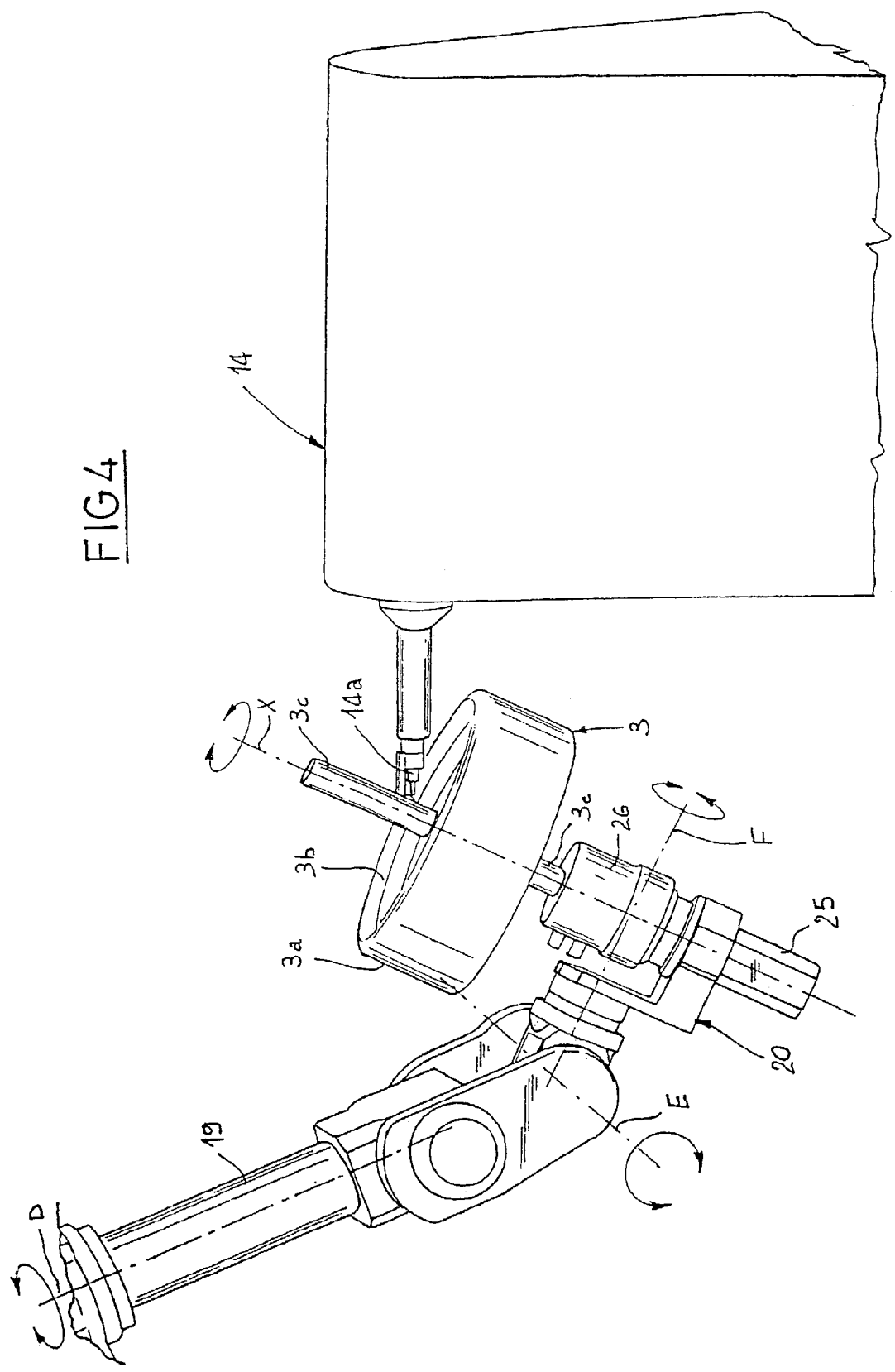
FIG. 4 shows an end head of the robotized arm during the deposition of an elongated element in an area proximate to the bead opposite the one of FIG. 3.

In this connection it is also to note that, as viewed from FIGS. 1, 3 and 4, the outer surface 3a, 3b of the toroidal support has a portion with a convex-profile bending 3a corresponding to the crown region of the tyre, and two distinct portions with a concave-profile bending 3b at the regions corresponding to the tyre sidewalls and proximate to the beads of the tyre itself. Under this situation, known solutions currently require employment of at least three delivery members, three extruders for example, to manufacture components covering the whole outer surface of the toroidal support, due to the fact that freedom of movement of each delivery member (movable in three axes) is not sufficient to follow the whole cross-section profile of the toroidal support. Vice-versa, movements carried out in accordance with the present invention enable the toroidal support to advantageously take any position and orientation relative to the delivery members, thus making it possible to distribute one or more elongated elements over the whole extension of the outer surface of the toroidal support itself.

In accordance with the invention, it is also advantageously possible for the toroidal support to be disposed with its geometric axis of rotation oriented vertically or at all events greatly inclined to a horizontal plane, at an angle, just as an indication, greater than 45°, as shown in FIGS. 3 and 4. Thus deposition of the elongated elements is facilitated above all at the side and/or radially inner regions of the outer surface of the toroidal support, where a convex bending and the effects of the force of gravity make it difficult to correctly carry out deposition, keeping the toroidal support oriented in a substantially horizontal axis of rotation.

From a comparison between FIGS. 3 and 4, it is readily apparent that the ample mobility of the toroidal support 3 in space, attained through the use of the robotized arm, allows to distribute uniformly over the entire outer surface 3a, 3b of the toroidal support itself the elongated element arriving from the delivery member 14a. In particular, it is made possible to apply the elongated element also in proximity to the radially interior areas 3b of the toroidal support, that is to say in the areas proximate to the beads of the tyre, where the outer surface assumes a concave profile, which would be difficult or impossible to reach if the application were performed according to the prior art.

The freedom of motion of the toroidal support 3 also allows easily to control the thickness of the elastomeric material component formed on the toroidal support 3. Using as an elongated element a continuous ribbon with flattened section, it is possible to modify the orientation of the outer surface 3a, 3b of the toroidal support 3 relative thereto in order to vary the thickness of the component which is formed between a minimum value, obtained when the strip-like element is deposed substantially "flatly", i.e. with the greater axis of its cross section oriented parallel to the outer surface 3a, 3b, and a maximum value, obtainable when the greater axis of the cross section of the strip-like element is substantially normal to the outer surface 3a, 3b. Thicknesses exceeding the maximum value specified above can also be obtained by forming multiple coils, one superimposed on the other, in a direction substantially normal to the outer surface of the toroidal support.

It is also to point out that the transverse distribution of the elongated element carried out in accordance with that which is suggested by the invention enables the same robotized arm to be utilised for obtaining both movement of the toroidal support for the purpose of achieving a transverse distribution, and transfer of the toroidal support itself between the different work stations.

This situation too represents an important advantage over the known art, where the presence of handlers or transfer lines is in any case required in addition to the means intended for movement of the extruder, in order to cause transfer of the toroidal support from one work station to the subsequent one.

It is further to note that also solutions based on employment of different extruders simultaneously operating on the toroidal support as provided in U.S. Pat. No. 5,221,406 have many limits, in that the available space for installation of the extruders and movement of same is greatly correlated with the space physically available around the outer surface of the toroidal support.

The present invention enables also these limits to be overcome, due to the possibility of carrying out transfer of the toroidal support by the same robotized arm as used for moving the toroidal support itself in front of the individual extruders, with wide operation spaces.

The invention claimed is:

1. An apparatus for manufacturing components for a tyre being worked, comprising:
   a toroidal support for carrying the components of a tyre being worked, wherein the toroidal support has an outer surface substantially matching an inner shape of the tyre;
   a first delivery member disposed adjacent to the outer surface of the toroidal support for feeding a first elongated element, when the toroidal support is at a first location;
   a second delivery member disposed adjacent to the outer surface of the toroidal support for feeding a second elongated element, when the toroidal support is at a second location;
   circumferential distribution devices arranged to drive the toroidal support in rotation around a geometric axis of rotation of the toroidal support, the circumferential distribution devices being configured to circumferentially distribute the first elongated element on the toroidal support when the toroidal support is at the first location, and being configured to circumferentially distribute the second elongated element on the toroidal support when the toroidal support is at the second location; and
   transverse distribution devices arranged to give controlled relative displacements between the toroidal support and the delivery member, the transverse distribution devices being configured to distribute the first elongated element on the toroidal support to form a first plurality of coils in side by side relationship in order to define a first tyre component at the first location, and being configured to distribute the second elongated element on the toroidal support to form a second plurality of coils in side by side relationship in order to define a second tyre component at the second location;
   wherein the transverse distribution devices operate on the toroidal support for moving the toroidal support relative to the delivery member,
   and wherein the circumferential distribution devices and the transverse distribution devices are integrated into a robotized arm.

2. The apparatus of claim 1, wherein the robotized arm comprises an end head set to engage the toroidal support rotatably about the geometric axis of rotation of the toroidal support, such that the toroidal support overhangs the end head set.

3. The apparatus of claim 1, wherein the robotized arm comprises:
   a first section having a first end rotatably connected to a support platform and having first and second oscillation axes perpendicular to each other;
   a second section connected to a second end of the first section and having third and fourth oscillation axes perpendicular to each other; and
   an end head arranged to rotatably engage the toroidal support around the geometric axis of rotation of the toroidal support, and connected to the second section and having a fifth oscillation axis perpendicular to the geometric axis of rotation of the toroidal support.

4. The apparatus of claim 3, wherein the fifth oscillation axis is substantially coplanar with the fourth oscillation axis, and wherein the end head can oscillate around at least a sixth axis offset from and parallel to the fifth oscillation axis.

5. The apparatus of claim 1, further comprising at least one work station spaced apart from the delivery member and configured for carrying out a different work step on the tyre, wherein the robotized arm is arranged to transfer the toroidal support between the feeding means and the at least one work station.

6. The apparatus of claim 5, wherein the at least one work station comprises a strip elements applicator configured for making at least one carcass ply by sequentially depositing strip elements onto the toroidal support, wherein the robotized arm is arranged to make the toroidal support rotate in a step-by-step movement around the geometric axis of rotation of the toroidal support to cause distribution of the strip elements according to a predetermined circumferential pitch.

7. A plant for making tyres for vehicle wheels, comprising the apparatus of claim 1.

8. An apparatus for manufacturing components for a tyre being worked, comprising:
   a toroidal support for carrying the components of a tyre being worked, wherein the toroidal support has an outer surface substantially matching an inner shape of the tyre;
   a delivery member disposed adjacent to the outer surface of the toroidal support for feeding an elongated element;
   circumferential distribution devices arranged to drive the toroidal support in rotation around a geometric axis of rotation of the toroidal support, the circumferential distribution devices being configured to circumferentially distribute the elongated element on the toroidal support;
   transverse distribution devices arranged to give controlled relative displacements between the toroidal support and the delivery member, the transverse distribution devices being configured to distribute the elongated element on the toroidal support to form a plurality of coils in side by side relationship in order to define a tyre component, the transverse distribution devices operating on the toroidal support for moving the toroidal support relative to the delivery member, the circumferential distribution devices and the transverse distribution devices being integrated into a robotized arm; and
   at least one work station spaced apart from the delivery member, wherein the robotized arm is arranged to transfer the toroidal support between the delivery member and the at least one work station.

9. The apparatus of claim 8, wherein the robotized arm comprises an end head set to engage the toroidal support rotatably about the geometric axis of rotation of the toroidal support, such that the toroidal support overhangs the end head set.

10. The apparatus of claim 8, wherein the robotized arm comprises:
    a first section having a first end rotatably connected to a support platform and having first and second oscillation axes perpendicular to each other;
    a second section connected to a second end of the first section and having third and fourth oscillation axes perpendicular to each other; and
    an end head arranged to rotatably engage the toroidal support around the geometric axis of rotation of the toroidal support, and connected to the second section and having a fifth oscillation axis perpendicular to the geometric axis of rotation of the toroidal support.

11. The apparatus of claim 10, wherein the fifth oscillation axis is substantially coplanar with the fourth oscillation axis, and wherein the end head can oscillate around at least a sixth axis offset from and parallel to the fifth oscillation axis.

12. The apparatus of claim 8, wherein the means for transverse distribution is configured to make at least one carcass ply by sequentially depositing strip elements onto the toroidal support, wherein the robotized arm is arranged to make the toroidal support rotate in a step-by-step movement around the geometric axis of rotation of the toroidal support to cause distribution of the strip elements according to a predetermined circumferential pitch.

13. A plant for making tyres for vehicle wheels, comprising the apparatus of claim 8.

* * * * *